Oct. 6, 1959  F. T. STANCHUS  2,907,863
GAS SHIELDED ARC CUTTING
Filed Jan. 6, 1958 5 Sheets-Sheet 1
Fig.1.
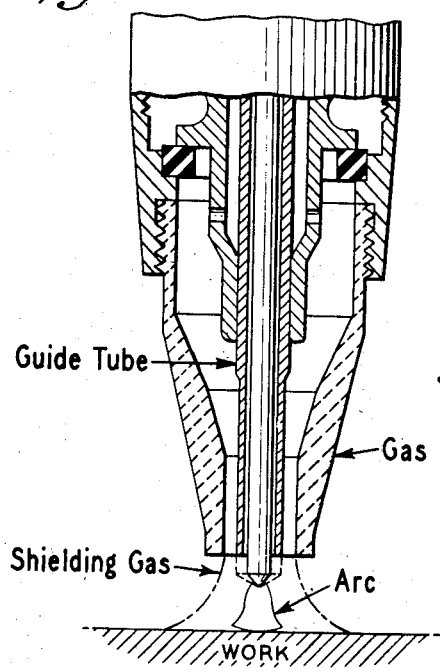
Fig.2.
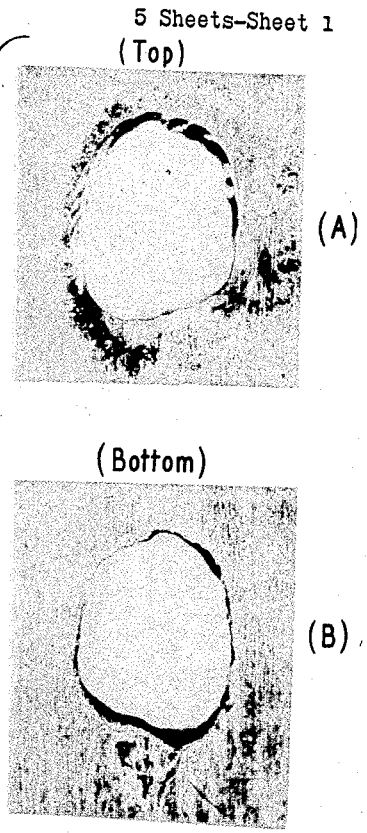
(Top) (A)
(Bottom) (B)
Fig.3.
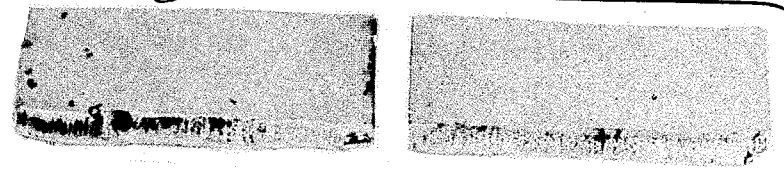
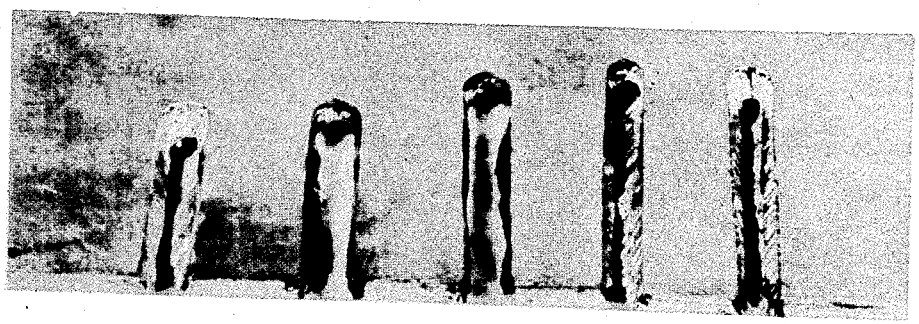
Fig.4.
INVENTOR.
FRANK T. STANCHUS
BY
Barnwell R. King
ATTORNEY (A) 60 IPM-400A-30V-60 CFH H-35
(B) 30 IPM-320A-35V-60 CFH H-35

(A) 1/2 INCH-25 IPM-400A-35V-60 CFH H-35
(B) 1/4 INCH-30 IPM-320A-35V-60 CFH H-35
(C) 1/8 INCH-60 IPM-280A-30V-60 CFH H-35

INVENTOR.
FRANK T. STANCHUS
BY Barnwell P. King
ATTORNEY

Oct. 6, 1959 F. T. STANCHUS 2,907,863
GAS SHIELDED ARC CUTTING
Filed Jan. 6, 1958 5 Sheets-Sheet 3

(A)

(B)

¼ INCH – 16 IPM – 360 A – 30 V – 60 CFH H-20

Non Whistling Case

Whistling Case

Showing 4 Progressive Positions of the
Surface Wave on the Arc Plasma, 1000 CPS

INVENTOR.
FRANK T. STANCHUS
BY Barnwell R. King
ATTORNEY

Oct. 6, 1959 F. T. STANCHUS 2,907,863
GAS SHIELDED ARC CUTTING
Filed Jan. 6, 1958 5 Sheets-Sheet 4
Fig. 10.
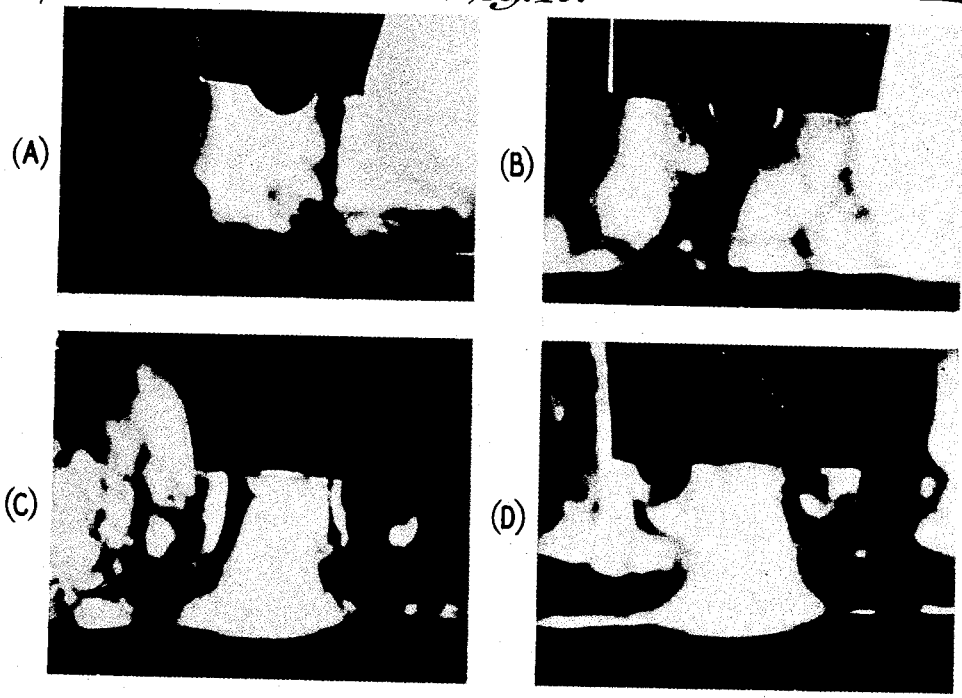
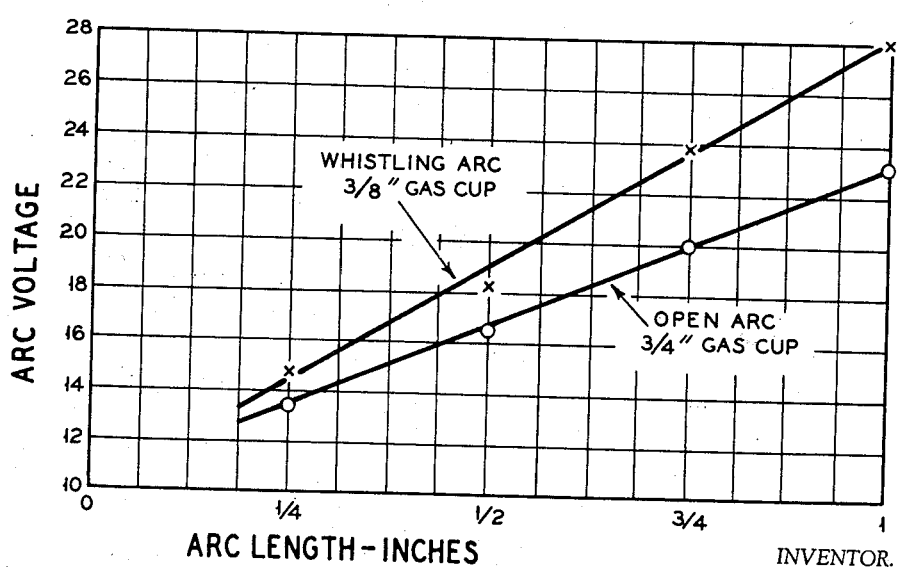
Fig. 11.
INVENTOR.
FRANK T. STANCHUS
BY
Barnwell R. King
ATTORNEY INVENTOR.
FRANK T. STANCHUS
BY
Barnwell P. King
ATTORNEY

United States Patent Office 2,907,863
Patented Oct. 6, 1959

2,907,863

GAS SHIELDED ARC CUTTING

Frank T. Stanchus, West Orange, N.J., assignor to Union Carbide Corporation, a corporation of New York Application January 6, 1958, Serial No. 707,319

3 Claims. (Cl. 219—69)

This invention relates to gas shielded arc cutting, and more particularly to the severing of work composed of metal such as aluminum, copper, and stainless steel, with an open electric arc that is shielded with a stream of any suitable gas such as argon, nitrogen, and mixtures of argon and hydrogen.

The present application is a continuation-in-part of my application Serial No. 603,926, filed August 14, 1956, for "Electric Arc Working," now Patent No. 2,876,329.

According to this invention there is provided a process of severing metal work with an open electric arc, which comprises the discharge of a suitable gas stream about the tip of a non-consumable electrode toward the work at a velocity high enough (at least 26 feet per second) to increase the voltage gradient of an open arc in circuit with such electrode and work to a value of more than 13 volts per inch. Such arc is energized between the electrode tip and work, melting through the adjacent metal of the work with such arc in such gas stream. The electrode, gas stream and arc are moved with respect to such work to thereby cut a clean kerf therein that is free of dross on at least one side.

Arc cutting is not new. Both carbon-arc and coated-electrode cutting or burning have been used in industry for many years by using a relatively high current on standard welding electrodes. Carbon-arc cutting involves maintaining an arc between a carbon or graphite electrode and the workpiece. The heat of the arc melts away the material. Either direct or alternating current can be used, although the former is preferred.

Coated-electrode cutting is used for small jobs where an oxy-acetylene torch or carbon electrode is not available. Electrodes with either gaseous or slagging type coating can be used. The latter type gives better results because higher current densities can be used. Either type of current (D.C. or A.C.) can be employed. Due to the high consumption of the electrode, low costs can not be realized. In addition, electrodes smaller than $5/32$ in. in diameter are not suitable because they heat up quickly due to resistance-heating and melt under the high currents used in the process. Very rough quality cuts are obtained, generally with wide kerfs and attached dross. Such processes are generally used only on steel and are not readily adaptable to non-ferrous metals.

A method which was recently invented (see Gage Patent No. 2,806,124) for cutting metals employs a constricted, wall-stabilized arc drawn between a non-consumable tungsten electrode and the workpiece in conjunction with a high-velocity gas stream. The gas stream, expanded by the arc, is forced through an orifice, applied to the workpiece, melting the metal, and the molten metal is continuously removed by the jet-like action of the gas stream to form a kerf. This gas, usually composed of 65% argon-35% hydrogen (H-35) for machine cutting, and 80% argon-20% hydrogen for hand cutting, prevents the kerf walls from oxidizing. A high quality, dross-free, sawlike cut can be produced on any non-ferrous metal by such method. However, apparatus problems are encountered such as double-arcing difficulties (main arc issuing through metallic nozzle rather than orifice) and the need for insulation in the apparatus. Also, the minimum speed was faster than manual operation would conveniently permit.

Inert gas shielded non-consumable electrode arc welding apparatus is similar to arc cutting equipment in that each employs an arc between a non-consumable electrode and the workpiece, and an arc shielding gas. In the welding equipment, however, a gas cup replaces the nozzle. Cutting attempts with such welding equipment usually resulted in undesirably wide and irregular kerfs with large dross formation on the finished workpiece. In addition, the entire operation was difficult to control. The welding torch-cutting method, therefore, can not be considered an efficient or sound process of cutting, but rather just a melting operation using ultra high currents.

The main object of this invention is to overcome such difficulties and disadvantages of the prior art. This is accomplished by the provision of a gas cup (nozzle) of somewhat smaller size than that used for welding, which is adapted to be quickly substituted for the latter to adapt the welding torch for cutting according to the present invention. By reducing the inner diameter of the gas cup, a gas constricted arc is formed. The use of the proper size cup quickly transforms the welding torch into an effective and satisfactory cutting torch.

There is a great demand for the invention in small shops and especially in those instances where the workman desires to alternately change from welding to cutting by merely changing cups. Even though the quality might not be as good as can be obtained with cutting, according to Gage, it is acceptable for many applications, inasmuch as a dross-free cut with a narrow kerf is obtained.

In the drawings:

Fig. 1 is a fragmentary view mainly in vertical cross section of a sigma (shielded-inert-gas-metal-arc) welding torch;

Figs. 2a and 2b are top and bottom plan views of a circular cut in a copper plate, made according to the invention;

Fig. 3 is a perspective view of straight cuts made in copper plate according to the invention;

Fig. 4 is a perspective view of cuts in copper plate made under various conditions;

Figure 12:
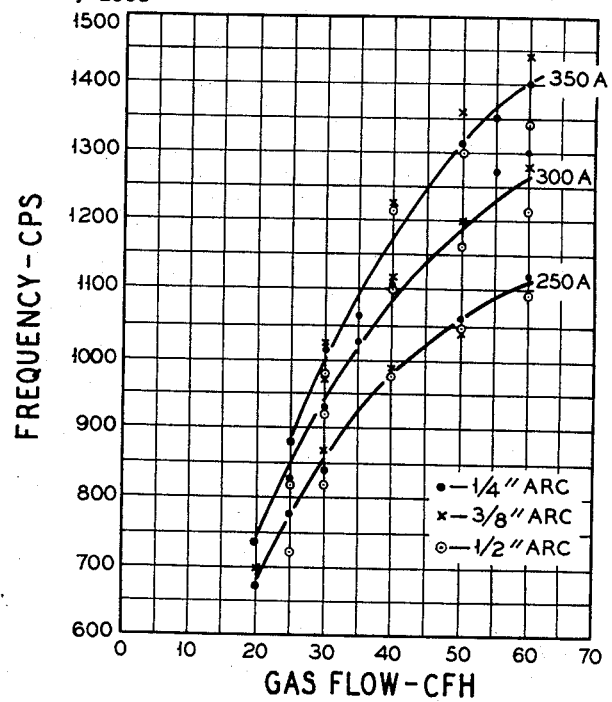
Figure 13:
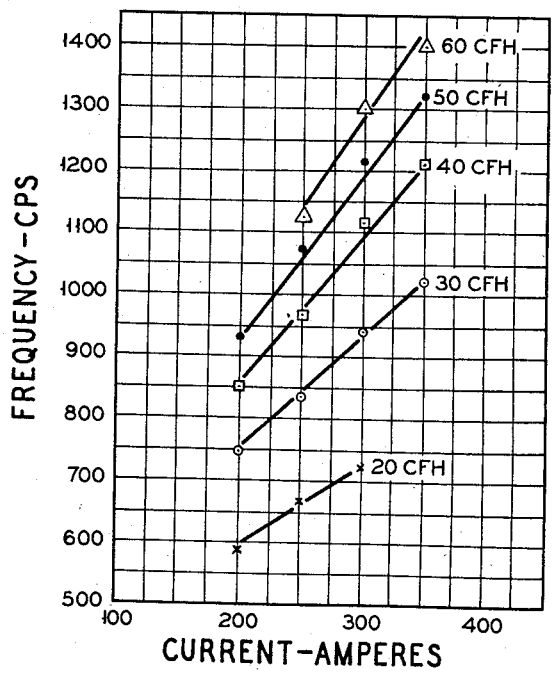

Figs. 9a, 9b, 9c, and 9d are similar views of a whistling arc;

Figs. 10a, 10b, 10c, and 10d are pictures of flow gas patterns employing the Schlieren technique;

Fig. 11 is a graphical representation of the voltage-arc length characteristics of whistling and non-whistling tungsten arcs at various gas flows;

Fig. 12 is a graph of frequency-gas flow characteristic curves of three different current arcs; and Fig. 13 is a graph of frequency-current characteristic curves for several different arc shielding gas flows.

The whistling arc as developed for the sigma welding of aluminum differs from a conventional sigma arc in that a relatively high velocity, small diameter annular flow of shielding gas surrounds the arc, rather than an essentially stagnant atmosphere. The annular flow, being comparable in diameter to that of the arc, axially stabilizes the arc. This stabilization plus a complete exclusion of air from the weld zone by the annular shield results in cleaner, more uniform weld beads.

The whistling sound appears to be caused by an interaction between the annular shielding stream and the arc plasma. The fact that superior welding performance can be obtained by the same equipment, whether whistling or not, is evidence that the whistle, or its source, is not an essential element in the process. However, the whistle is useful in indicating that the gas flow pattern and position of the annular arc in the gas shield is optimum. Fig. 1 shows the geometrical arrangement of the whistling arc for sigma welding. Gas flows above 30 c.f.h. with arc currents above 200 amperes produce a whistling tone with a frequency of about 1000 cycles per second.

Figure 8:
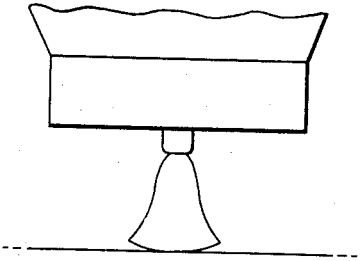
Fig. 8 is a fragmentary view in side elevation of a non-whistling arc.
Figure 9:
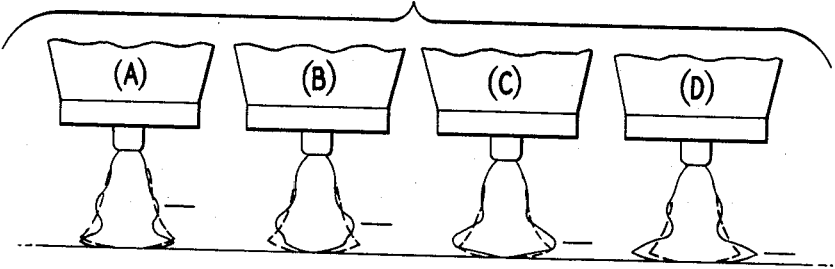

Further investigation of the whistling phenomenon was carried out with a ¼-inch diameter tungsten electrode in place of the guide tube and metal electrode shown in Fig. 1. This gave a very stable arc that was easy to work with. Figs. 8 and 9 show the action of the arc plasma under non-whistling and whistling conditions as observed in movies taken at 6000 frames per second. In the non-whistling case the plasma is very steady. In the whistling case the plasma is very stable in direction but a wave motion builds up on the periphery of the plasma much like a wave building up on the surface of a liquid under the influence of wind. The wave starts near the cathode with small amplitude and increases in amplitude until it reaches the end of the plasma at the workpiece. The wave travels with about the same velocity as the shielding gas (26 feet per second for a gas flow of 40 c.f.h.). In many cases a second and even a third harmonic wave is also visible. These waves travel with a slightly higher velocity than the fundamental wave.

It was observed in the whistling arc that the arc column gradient was 18 volts per inch in argon while for a normal open argon arc the column gradient was 13 volts per inch. Advantage is taken of this increased column gradient where a stiff deeply penetrating arc is desirable.

Fig. 12 shows the fundamental frequency of whistle versus gas flow as obtained with a sound analyzer at several arc currents. The frequency does not increase linearly with increased flow. In all cases, the second and third harmonic are observed. The intensity of the harmonic generally decreases as the order of the harmonic. In some cases the second harmonic is almost as intense as the fundamental. In others, the second harmonic is not sharply defined, but there is a band of frequencies in the neighborhood of the second harmonic. When the second harmonic is very intense an additional wave is observed on the periphery of the arc corresponding in frequency with the second harmonic.

Fig. 13 shows the frequency as a function of arc current for various gas flows. The frequency increases almost linearly with arc current. The frequency of whistle is independent of arc length of a ⅜-inch diameter gas cup. Some dependence on length was observed when a ½-inch diameter gas cup was used with a ¼-inch electrode.

The intensity of the whistle is a function of gas flow, arc current and arc length. The most intense whistle observed was at 350 amperes, 17.5 volts, 50 c.f.h. argon, and ½-inch arc length. The fundamental frequency was 1300 c.p.s., with harmonics at 2600, 3900, 5200, and 6500 c.p.s. Higher harmonics were probably present but the limit of the frequency measuring equipment was 7200 c.p.s. Presumably the current and the arc length were increased, more and more intense sound could be produced and more harmonics were measurable.

The arc stops whistling at low gas flows and high currents. For example, at 350 amperes and 20 c.f.h. the arc does not whistle regardless of the arc length. Whistling starts at about 23 c.f.h. and builds up in intensity to 50 c.f.h. and then decreases in intensity again. For gas flows in excess of 70 c.f.h. the well-defined tone degenerates and the arc becomes noisy.

Fig. 11 shows the voltage-arc length characteristics for the whistling tungsten arc and for the non-whistling tungsten arc at various gas flows. For a given arc length the voltage decreases slightly as the gas flow is increased. For example, for a ¼-inch arc at 300 amperes and 30 c.f.h. the voltage is 14.8 volts, and for 60 c.f.h. the voltage is 14.0 volts. The change in voltage with increasing gas flows is less for longer arc lengths.

The column gradient for the non-whistling arc from the slope of the curve is 13 volts per inch while the whistling arc column gradient is 18 volts per inch. However, the heat transferred to the anode by the whistling arc is only about 5 percent greater than that transferred by the open arc.

Figs. 10a through 10d show pictures of gas flow patterns taken by the Schlieren technique. Fig. 10a was taken using a No. 6 gas cup (⅜-inch I.D.) and a ¼-inch electrode using a mixture of argon and helium. Fig. 10b shows the same gas flow through a No. 12 gas cup (¾-inch I.D.). Turbulence is very evident throughout the entire gas shield of Fig. 10b while Fig. 10a shows the smoother flow obtained when using the smaller gas cup. Figs. 10c and 10d show the gas flow patterns with a 300-ampere arc. The smooth outlines of the gas shield are clearly shown in Fig. 10c while the generally turbulent shield of the No. 12 gas cup is shown in Fig. 10d. With the small gas cup, the shield maintains smooth streamline flow right down to the workpiece. The arc assists in shaping the flow of gas so that the shielded area is much larger than the diameter of the gas cup. Measurements of air contamination have shown that the area shielded by the No. 6 gas cup is at least as large as that shielded by a No. 12 gas cup with the same amount of gas flowing through the cups. The flow as shown in Fig. 10b and Fig. 10d introduces air into the shield by drawing it in at the turbulent boundaries of the pattern. This mechanism for contamination is not present in the smooth flow pattern shown in Figs. 10a and 10c.

In conclusion, then, the whistle of the arc is an interaction between the arc plasma and the shielding gas. The arc may be considered to be in reality a jet of hot gas and when the proper relationships between the velocities and densities of a jet and its surrounding atmosphere are established, the jet will whistle. The theory for instability of jets in two dimensions has been worked out by Rayleigh ("Theory and Sound," reprinted by Dover Publications, New York (1945)), but the extension to three dimensions is quite complicated. It turns out that the boundary between the jet and its surroundings is usually more unstable for one particular wave length than any other; this wave length prevails over the others, and a single tone with its harmonics is heard. In cases where no particular wave length is more unstable, the jet becomes noisy.

The voltage variation in the tungsten electrode whistling arc is always sinusoidal and has the frequency of the fundamental whistling tone. Simultaneous high speed movies and arc voltage traces show that the arc voltage variation is in synchronism with the fundamental frequency wave such that when the crest of the wave reaches the anode the voltage is a minimum and when the valley of the wave reaches the anode the voltage is a maximum. It is also noted that the plasma is forced down into the anode as the crest of the wave moves downward to the anode surface. The voltage variation may be a change in anode fall as the arc plasma is forced down onto the anode. A decrease in anode fall may also be responsible for the decrease in arc voltage as the gas flow is increased from 30 to 60 c.f.h. These data would then imply that the anode fall for a ½-inch diameter 300-ampere argon arc with a water-cooled anode is at least 0.5 volt.

Good quality cuts were obtained using a torch equipped with a No. 4 (¼-inch diameter) cup with a current of 500 amperes, arc length of ⅓₂-inch, electrode diameter of ⁵⁄₃₂-inch, and a cutting speed of 8 to 32 i.p.m. The average argon flow rate was 30 c.f.h. (gas velocity of 28.0 f.p.s.); the minimum flow rate was about 2 to 3 c.f.h. Best results were obtained with a flow rate of about 40 c.f.h. (gas velocity of 34.4 f.p.s.).

Fig. 2 shows the quality of cuts obtained on copper. The upper figures show the top and bottom sides of a circle cut in copper in the vertical position; the dross was removed from the bottom side. The lower photograph Figs. 3 and 4 shows straight line cuts made in copper using various conditions.

Using a machine torch with an adaptor to accommodate HW-10 size cups, cuts were made in ⅛-, ¼-, and ½-inch thick aluminum, ¼- and ½-inch thick stainless steel (type 304), and ¼- and ½-inch thick copper. A manual welding torch was also tested for cutting selective thicknesses of the various metals. Various gas flow rates were employed throughout the experiment. The majority of the cuts were made with a No. 4 cup. The combination of the No. 4 cup (¼-inch diameter) and the ⅛-inch diameter electrode produced the best cuts. The use of larger diameter cups produced poor quality cuts with wide kerfs. For a flow of 60 c.f.h., the gas velocity is 65 f.p.s. with No. 4 cup and ⅛-inch electrode.

The dross generally formed on only one side of the cut. The displacement of this dross to the one side seemed to be controlled by two factors: first, the position of the ground connection—dross forms on the side opposite the ground and second, the temperature differential on the two sides of the cut—dross forms on the side with the least mass. The dross formation on the scrap or "hot" side could not be reduced by extending the electrode down into the kerf. As the use of this extension increased the possibility of electrode contamination, all cuts were made with the electrode extending ¼-inch below the cup and spaced approximately ¹⁄₁₆-inch above the plate.

Figure 5:
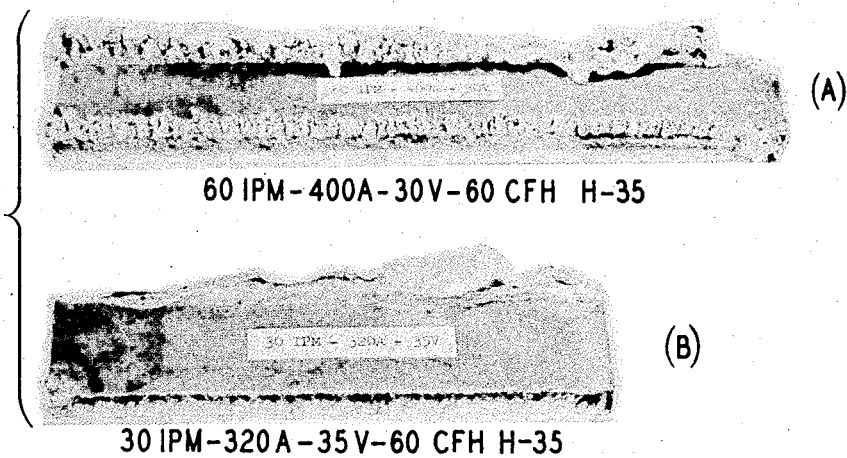
Fig. 5a is an upside down perspective view of cuts made at too high cutting speeds.
Fig. 5b is a similar view of cuts made at optimum cutting speeds.

Since apparently none of the dross is actually removed but is instead displaced from one side to the other, cutting must be done at a reasonably slow speed and with the use of a high current to keep the dross molten long enough to allow it to flow to the scrap or opposite-the-ground side. The top sample in Fig. 5 shows that the dross will form on both sides if the cutting speed is too high. The lower sample shows the type of melted-metal dross that forms on the scrap side and the appearance of the base side if optimum cutting speeds are used.

Various flow rates were employed using the different diameter cups. No advantage was noted using the extremely high flow rates, such as 100 c.f.h. Good cut quality was obtained with flow rates in the order of 50 c.f.h. Very little differences, if any, could be noted in the cut quality and efficiency when using gas containing a mixture of 35 percent hydrogen and 65 percent argon on any of the metals cut. Nitrogen was also employed with fair results on stainless steel, and copper, and with poor results on aluminum. A very unstable, noisy arc was obtained using nitrogen.

Figure 6:
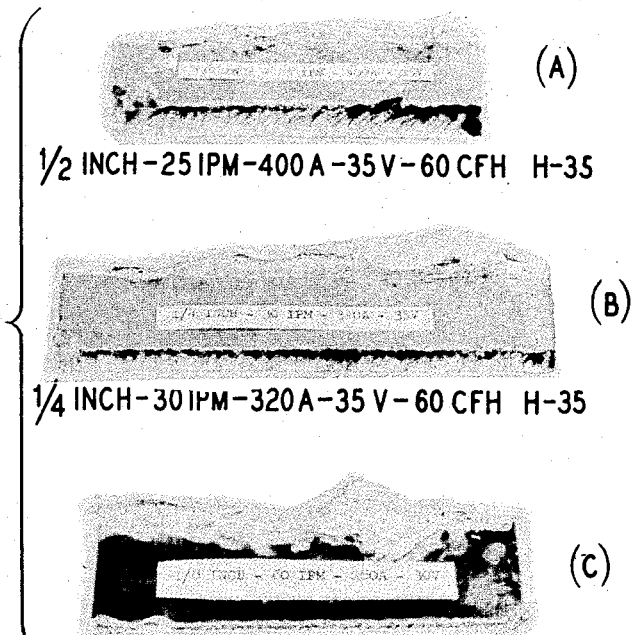
Figs. 6a, 6b and 6c are upside down perspective views of cuts at different speeds in aluminum plate of different thicknesses.
Figure 7:
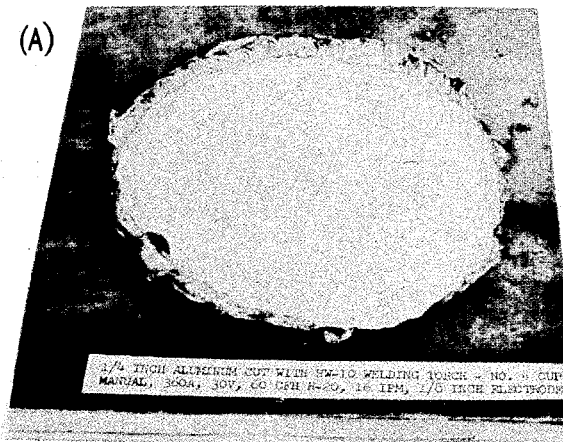
Figs. 7a and 7b are upside down perspective views of a plate and resulting disc made by a circular cut.
Figure 7:
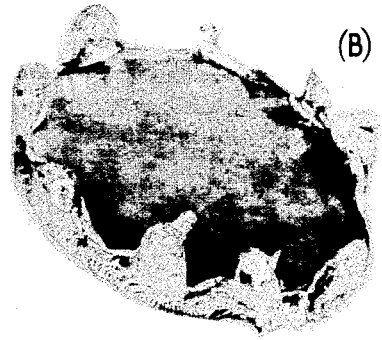

Thicknesses of aluminum from ⅛ to ½-inch were cut at various speeds and typical samples are shown in Fig. 6. Dross-free quality on the ⅛-inch thickness could not be obtained until a speed of approximately 60 i.p.m. was reached. It appears that a maximum and minimum speed is associated with this method of cutting as is indicated by the minimum speed necessary on ⅛-inch and the maximum speed associated with ¼-inch thick aluminum. A circular cut was made manually using the torch and the lower side quality of this sample is shown in Fig. 7. In this case practically all of the dross was attached to the removed portion, thus indicating that the temperature differential factor was influential on the location of the dross rather than the placement of the ground. Similar quality cuts were obtained on ¼- and ½-inch thick copper and ¼- and ½-inch thick stainless steel. The base side in each case was free of dross and the scrap side retained all of the dross.

Much better quality cuts on both sides at higher speeds can be made using the Gage cutting process. However, when employing the present invention for cutting, no variables with the possible exception of speed are critical; that is, no double-arcing difficulties, no damage from touching equipment to workpiece, no fixed arc length, and no critical electrode placement with respect to the cup.

Acceptable quality cuts on one side can be made using standard non-consumable electrode inert gas shielded arc welding torches equipped with small gas cups (preferably No. 4) on practically all metals, with a flow rate of approximately 50 c.f.h. of either argon gas, or gas composed of a mixture of 35 percent hydrogen and 65 percent argon. Since the formation of dross is dependent on several factors, it is not always possible to accurately predict which side of the cut will be dross-free. Good quality cuts can be achieved by this method whether or not a whistling sound accompanies the arc. The preferred shielding gas flow range, as demonstrated by the quality of cuts achieved in laboratory tests, appears to be from 30 c.f.h. to about 60 c.f.h., with gas velocities from 26 f.p.s. to about 65 f.p.s., depending upon the particular size gas cup and electrode used. As is pointed out above, there appears to be no advantage in using extremely high gas flow rates, such as 100 c.f.h. However, metal has been severed according to this invention using gas flows of 2 to 3 c.f.h.

What is claimed is:

1. Process of cutting a kerf in metal, which comprises discharging a gas stream around the tip of a non-consumable electrode, and striking a metal cutting open arc between such electrode tip and the metal to be cut, characterized in that the velocity of such gas stream is sufficient to produce a clean kerf in such metal that is free of dross on at least one side, such velocity being between 26 and 65 feet per second.

2. Process of cutting a kerf in metal, which comprises discharging a gas stream around the tip of a non-consumable electrode, and striking a metal cutting open arc between such electrode tip and the metal to be cut, characterized in that the velocity of such gas stream is sufficient to produce a clean kerf in such metal that is free of dross on at least one side in which such velocity falls between 26 and 65 feet per second, and voltage gradient of the arc is more than 13 volts per inch.

3. An electric arc torch for cutting a kerf in metal, which comprises a non-consumable electrode having an arcing tip, a nozzle surrounding said electrode in spaced relation, said nozzle having an internal diameter that is of the order of, at most, twice the outside diameter of said electrode, the end of said nozzle terminating short of said tip for discharging selected gas in an annular stream around said tip after such gas leaves said nozzle, and means for discharging such gas at a velocity of between 26 and 65 feet per second such that a cutting arc struck between said tip and metal to be cut produces a clean kerf in said metal that is free of dross on at least one side.

References Cited in the file of this patent

UNITED STATES PATENTS

| | | |
|---|---|---|
| 2,063,467 | Southgate | Dec. 8, 1936 |
| 2,125,172 | Kinzel | July 16, 1938 |
| 2,468,808 | Drake | May 3, 1949 |